United States Patent
Ferragut et al.

(10) Patent No.: US 10,572,659 B2
(45) Date of Patent: Feb. 25, 2020

(54) CYBER PHYSICAL ATTACK DETECTION

(71) Applicant: UT Battelle, LLC, Oak Ridge, TN (US)

(72) Inventors: Erik M. Ferragut, Oak Ridge, TN (US); Jason A. Laska, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 108 days.

(21) Appl. No.: 15/709,176

(22) Filed: Sep. 19, 2017

(65) Prior Publication Data

US 2018/0082058 A1 Mar. 22, 2018

Related U.S. Application Data

(60) Provisional application No. 62/397,095, filed on Sep. 20, 2016.

(51) Int. Cl.
  *G06F 21/55* (2013.01)
  *G06F 21/57* (2013.01)
  *H04L 29/06* (2006.01)

(52) U.S. Cl.
  CPC .......... *G06F 21/552* (2013.01); *G06F 21/554* (2013.01); *G06F 21/57* (2013.01); *H04L 63/1433* (2013.01)

(58) Field of Classification Search
  CPC ...... G06F 21/552; G06F 21/554; G06F 21/57; H04L 63/1425; H04L 63/1433; H04L 63/1466
  See application file for complete search history.

(56) References Cited

U.S. PATENT DOCUMENTS

| | | | | |
|---|---|---|---|---|
| 7,051,368 | B1* | 5/2006 | Howard | G06F 21/554 717/143 |
| 2008/0189061 | A1* | 8/2008 | Scholtz | H02G 7/02 702/65 |
| 2014/0137257 | A1* | 5/2014 | Martinez | H04L 63/1433 726/25 |
| 2014/0172125 | A1* | 6/2014 | Shokooh | G05B 13/04 700/29 |
| 2016/0155136 | A1* | 6/2016 | Zhang | G06Q 30/0201 705/7.29 |

(Continued)

OTHER PUBLICATIONS

Annarita et al. phasor measurement until selection for unit selection for unobservable electric power data integrity attack detection, 2014, pp. 155-164. (Year: 2014).*

(Continued)

*Primary Examiner* — Luu T Pham
*Assistant Examiner* — Canh Le
(74) *Attorney, Agent, or Firm* — Benesch, Friedlander, Coplan & Aronoff LLP

(57) ABSTRACT

A cyber-security threat detection system and method stores physical data measurements from a cyber-physical system and extracts synchronized measurement vectors synchronized to one or more timing pulses. The system and method synthesizes data integrity attacks in response to the physical data measurements and applies alternating parametrized linear and non-linear operations in response to the synthesized data integrity attacks. The synthesis renders optimized model parameters used to detect multiple cyber-attacks.

17 Claims, 5 Drawing Sheets

(56) References Cited

U.S. PATENT DOCUMENTS

| | | | | |
|---|---|---|---|---|
| 2016/0163321 A1* | 6/2016 | Arnott | ............... | G10L 19/008 704/500 |
| 2016/0239010 A1* | 8/2016 | McDaniel | ............... | H02J 3/00 |
| 2016/0358074 A1* | 12/2016 | Latapie | ............... | G06N 3/088 |
| 2017/0076224 A1* | 3/2017 | Munawar | ............... | G06N 3/084 |

OTHER PUBLICATIONS

Yanan, Multimodal video classification with stacked contractive autoenoders, 2015, pp. 761-766. (Year: 2015).*

Yilin Mo et al., "Cyber-Physical Security of a Smart Grid Infrastructure," vol. 100, No. 1, Jan. 2011, pp. 195-209 (Year: 2011).*

Thomas Chen et al., "Petri Net Modeling of Cyber-Physical Attacks on Smart Grid," 2011, pp. 741-749. (Year: 2011).*

* cited by examiner

CYBER PHYSICAL ATTACK DETECTION

RELATED APPLICATION

This application claims the benefit of priority of U.S. Provisional Pat. App. No. 62/397,095 filed Sep. 20, 2016 and titled "Cyber Physical Attack Detection," which is incorporated by reference.

STATEMENT REGARDING FEDERALLY SPONSORED RESEARCH AND DEVELOPMENT

This invention was made with government support under Contract No. DE-AC05-00OR22725 awarded by the United States Department of Energy. The government has certain rights in the invention.

BACKGROUND

Technical Field

This application relates to cyber security and more specifically, to cyber security systems that scale to enterprise systems.

Related Art

Contemporary cyber security systems rely on anomaly detections and physical law detections to discern cyber threats. The replay of a response from a prior execution may subvert such systems because it may not appear peculiar, irregular or abnormal. Under anomaly detection, such threats can go undetected. The monitoring of physical relationships by the execution of physical equations may similarly miss such an attack. Physical law detections often depend on monitoring system parameters and such parameters are not always known. These systems, like other cyber security systems, require excessive resources to implement and detect threats, lack dynamic threat modelling, and are difficult to integrate in enterprise architectures.

DETAILED DESCRIPTION OF THE PREFERRED EMBODIMENTS

Cyber security systems and methods (referred to as system(s)) infer and monitor interactions to identify cyber threats. These systems identify malicious sensor measurements that may appear reasonable in isolation but are detectable when analyzed in contexts executed by the disclosed cyber security systems. In electrical systems, for example, sensors may monitor conditions that are collectively constrained by the physical phenomenon of the monitored signals or objects. The physical phenomenon may constrain the interactions between matter and energy, such as when energy flows through a power grid that is monitored by phasor measurement units (PMUs). As PMU readings (e.g., physical data measurements) are processed, dependencies are observed, deviations are detected, and data integrity errors are identified by the cyber security systems.

The cyber security systems do not require existing knowledge of physical relationships to detect cyber-attacks; nor do they require labeled data to detect cyber-attacks. The systems execute low latency processes that operate within many cyber-physical systems. The cyber-physical systems include power distribution systems; hydrogenation systems, heating, ventilation and air conditioning systems, industrial plants, manufacturing plants, chemical processing plants, and nuclear facilities. The systems also monitor devices and structures for transporting persons and/or things such as aircrafts, ships, and automobiles.

The cyber security systems are data-driven and include machine-learning classifiers programmed to identify cyber-attacks. Some systems generate models trained on features constructed from real-time or static data sets. The data sets are processed from multiple buses, branches, and loads that may be identified from a configuration file stored in memory that provide the network bus and branch parameters. Applying a probabilistic model derived from the buses and branches of the network, parameter files are created that simulate one or more cyber-attacks. While the system encompasses many techniques for generating coefficient weights for classifiers, a deep unsupervised learning is used in some systems to construct a neural network machine learning classifier. The deep unsupervised learning learns features by processing multiple stacks through a stacked auto-encoder. Particularly, each layer of the stack is trained individually in an unsupervised sequence, and afterwards backpropagation fine-tunes the coefficient weights that are transferred to a classifier that detects cyber threats. The classifier detects an attack in response to a real-time or batch data feed, and upon detection of an attack, transmits a signal that flags the attack.

Figure 1:
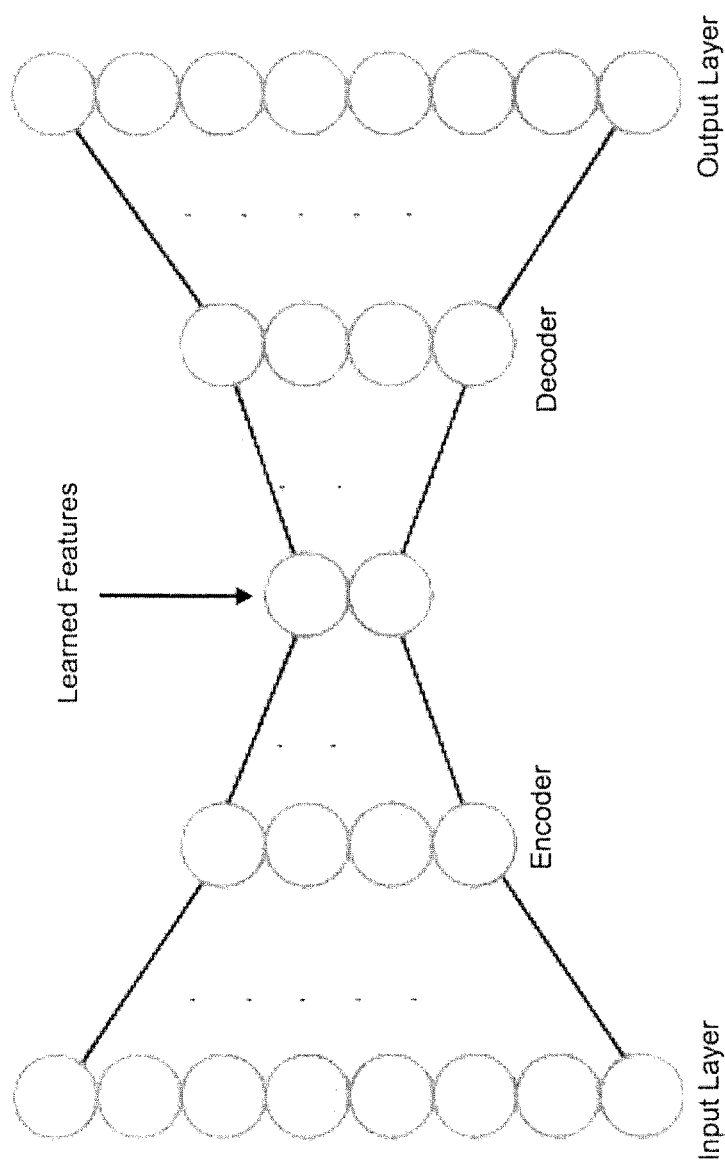
FIG. 1 is an auto-encoder scheme.

In FIG. 1, the auto-encoder generates a representation of a cyber-attack by auto mapping a larger x input layer to a smaller output layer y through an encoder, while the decoder performs an inverse, mapping the smaller output y to an input z. The auto-encoder minimizes the error between x and z. Due to its functional aspects, scalability, and performance, cyber-attack responses occur within specified time, constraints that in some applications are in the order of milliseconds. By processing data at the same rate the data is received or at a rate faster than the external process it monitors, the cyber-security systems operate in real-time allowing the system to respond and identify attacks as they occur.

Figure 2:
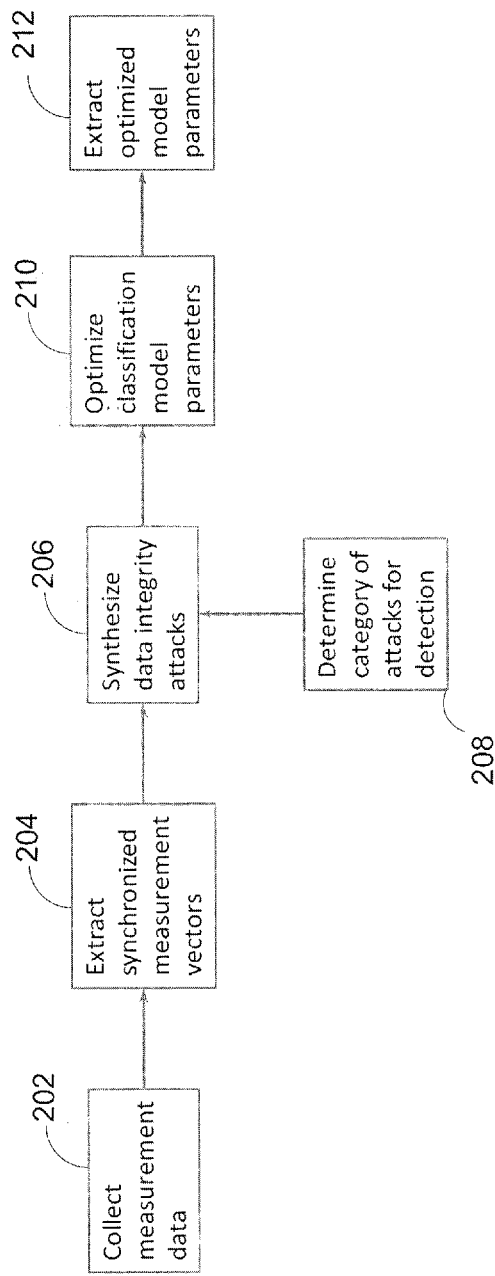
FIG. 2 is a model parameter optimization process.

FIG. 2 is a model parameter optimization process. The process trains a machine learning classifier 410 shown in FIG. 4 to distinguish attacks at different locations in a network. In a power grid application, the data collector 202 of FIG. 2 runs constantly or on a programmable schedule to collect measurement data from sensors at 202 such as PMUs monitoring a power grid. Some data may comprise six or twelve dimensions of a three phase power that represents the voltage and/or current and phase condition from a power source.

At predetermined time intervals, the optimization process extracts data and generates measurement vectors at 204. The measurement vectors may be synchronized to one or more timing pulses that synchronize the optimization process. If data is not sampled or sourced, the optimization process designates a vector based on no data and if measurements do not directly align with one or more timing pulses, the optimization process estimates the vector by an interpolation between prior and successive vectors.

Data sets are constructed at 206 from the synchronized measurement vectors and one or more determined threat profiles at 208. Using a probabilistic model, parameter models are created from the synchronized measurement vectors and threat profiles that render parameter files that represent various types of attack. Simulations of network-centric systems made up of continuous and discrete event subcomponents then process the parameter files. In an electric grid application, the parameter files may be processed by simulations of electric power systems such as power systems emulated by a Toolkit for HYbrid Modeling of Electric (THYME) power systems.

In FIG. 2, various types of attacks are simulated and thereafter detected. These include but are not limited to replaying information from a previous execution in an attempt to subvert a system protocol known as a replay attack and a variable latency attack where sensors either repeat measurements or do not render measurements resulting in small differences in data timings. Other simulated and detectable attacks include sensor freeze attacks where sensors stop updating and either render no data or continue to transmit old data and additive noise attacks where random noise is added into the sensor measurement values. Other simulated and detectable attacks vary sensor bias by varying the sensor measurement at a dynamic rate (e.g., sensor bias attacks) and rendering different measurements than those that were detected (e.g., data injection attack).

With the types of attacks defined, the parameter optimization process renders new or modified measurement vectors that exhibit the attack behavior at 206. The synthesis electronically marks the new or modified vector of its particular condition or status such by a "ground truth" mark indicating whether the attack was synthesized and, if so, what kind of attack it was, and where within the system the attack occurred (e.g., in a power grid application, on which bus did the attack occur or originate).

Applying alternating parameterized linear and nonlinear operations to the measurements and outputs, a vector of coefficient weights associated with each possible attack profile renders a classification model at 210. A cost function is generated and minimized when the ground truth marking receives the largest output vector weight for each processed input. A subset of vectors is processed iteratively to compute the cost function, to compute the partial derivative of the cost function with respect to the model parameters, and to update the model parameters proportionally to their partial derivatives. After one or more iterations, the parameters reach optimum values that are associated with the prediction of the attack profile associated with the new or modified measurement vectors. The classification model may thereafter process the remaining vectors (e.g., those not belonging to the subset of vectors) to assess the confidence level of the optimization process. Once assured by the confidence level exceeding a predetermined threshold, the weight coefficients of the classification model parameters are stored in memory or copied to the classifier 302 shown in FIG. 4.

Figure 3:
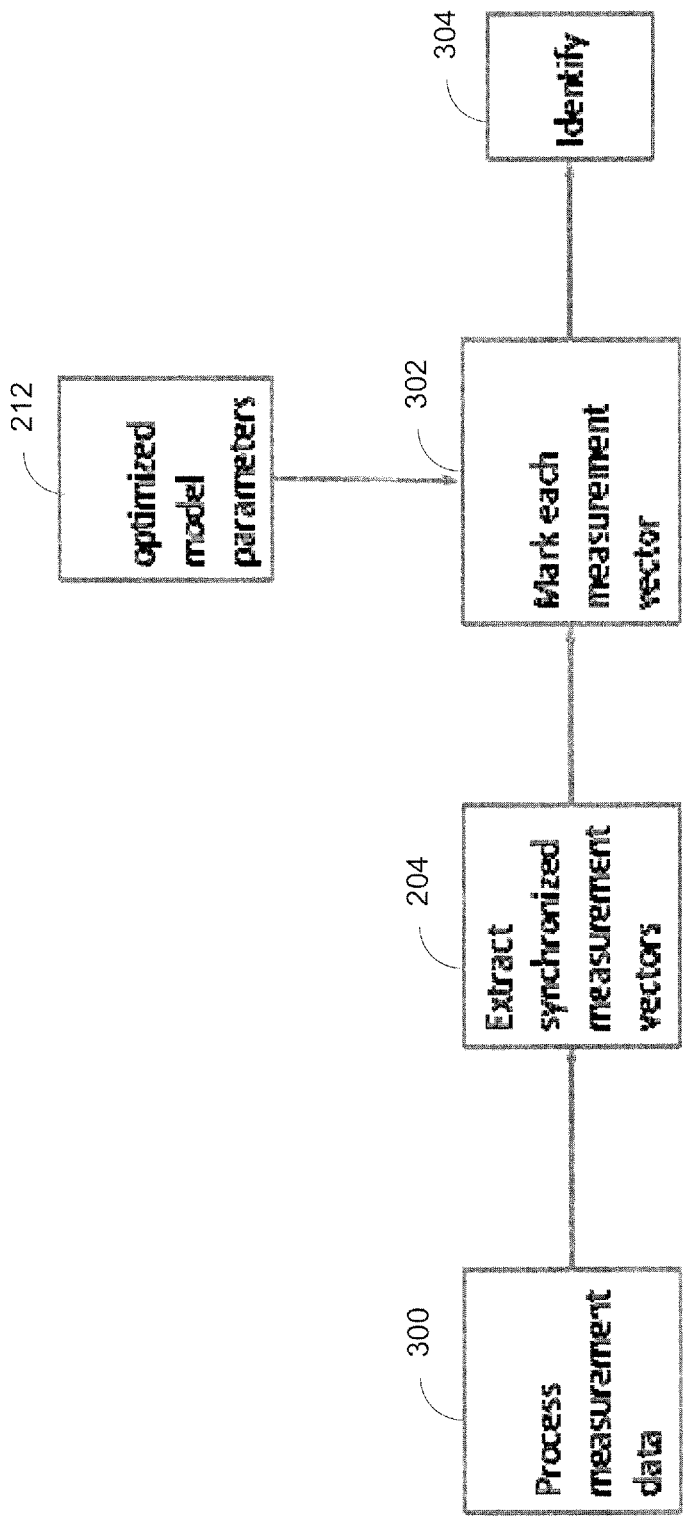
FIG. 3 is a threat detection process.

FIG. 3 is a threat detection process. The threat detection processes a fixed data set as was processed in FIG. 2 and/or real-time streaming data at 300. At predetermined time intervals, the threat detection process extracts data and generates measurement vectors at 204. The measurement vectors are synchronized to one or more timing pulses that synchronize the threat detection process. If data is not sampled, the threat detection process designates a vector based on no data and if measurements do not directly align with one or more timing pulses, the threat detection process render a vector by an interpolation between prior and successive vectors.

Using the weight coefficients of the classification model parameters 212, the threat detection process detect cyber-attacks, and thereafter electronically identifies and electronically marks the extracted synchronized measurement vectors as anomalous or by their names when threats are identified at 302 and 304.

Figure 4:
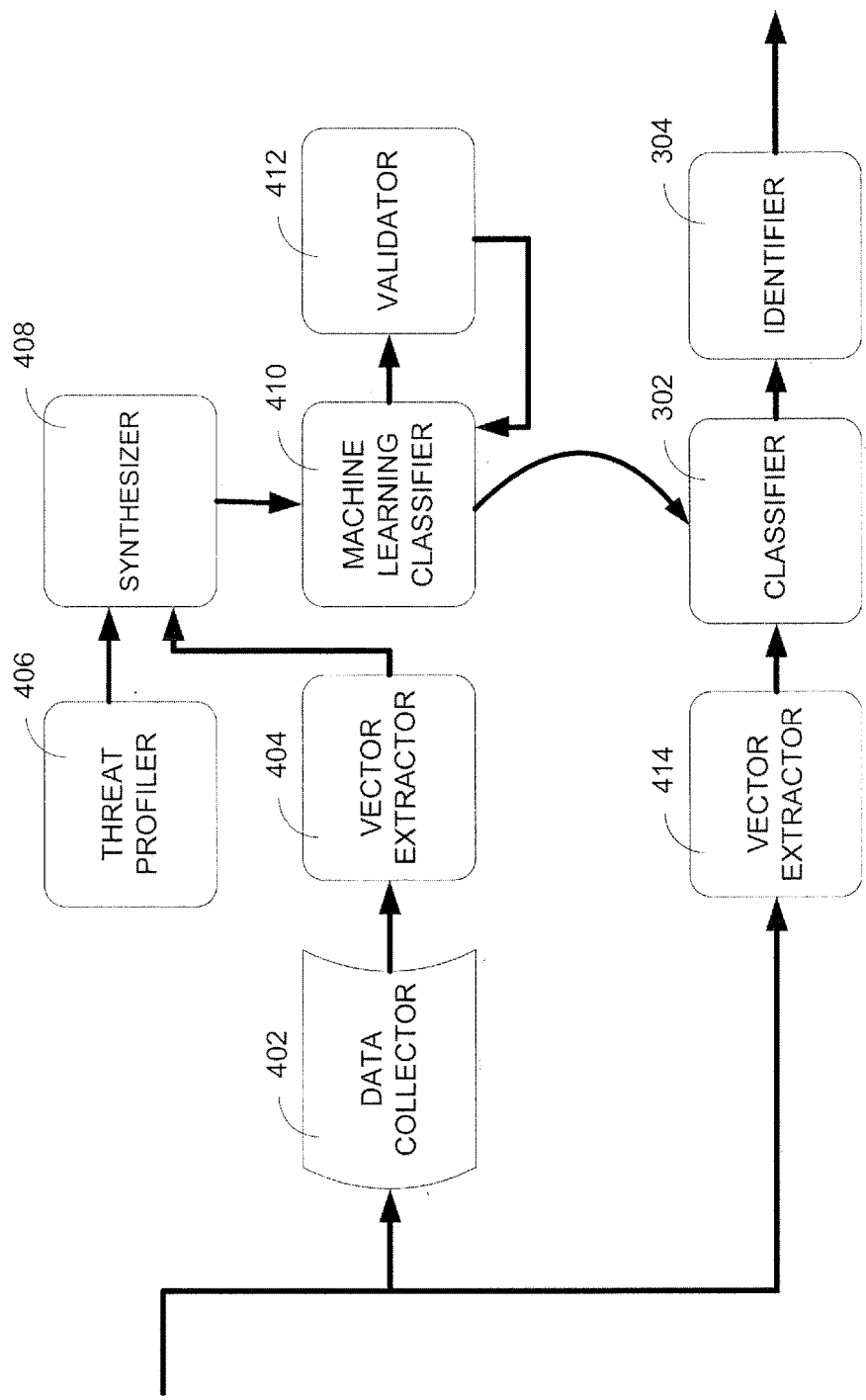
FIG. 4 is a cybersecurity threat detection system.

FIG. 4 is a cybersecurity threat detection system that executes a model parameter optimization and detects threats. As shown, a data collector 402 running in real-time or on a programmable schedule collect measurement data from sensors. In power systems, the data may comprise six or twelve dimensions of data that represents the voltage and/or current and the phase condition from a three-phase power source. A vector extractor 404 extracts data and generates measurement vectors at predetermined time intervals. The measurement vectors may be synchronized to one or more timing pulses. If data is not sampled or sourced, the vector extractor 404 designates a vector based on no data and if measurements do not directly align with one or more timing pulses, the vector extractor 404 interpolates the data or vectors rendered from the data to estimate and render the vector.

Data sets are thereafter synthesized by a vector synthesizer 408 from the synchronized measurement vectors and one or more threat profiles provided by the threat profiler 406. Using probabilistic functions, parameter models are created by the vector synthesizer 408 from the synchronized measurement vectors and threat profiles provided by the threat profiler 408 that render parameter files that represent various types of attack. Simulations of network-centric systems made up of continuous and discrete event subcomponents then process the parameter files.

In FIG. 4, the threat profiler 406 simulates various types of attacks. These attacks include, but are not limited to, replay attacks, variable latency attacks, sensor freeze attacks, additive noise attacks, and data injection attacks. In FIG. 4, a vector synthesizer 408 renders new or modified measurement vectors that exhibit various attack behavior characteristics. The vector synthesizer 408 electronically marks the new or modified vector of its particular condition or status such by a "ground truth" marking indicating whether the attack was synthesized and, if so, what kind of attack it was, and where within the system the attack occurred.

Applying alternating parameterized linear and nonlinear operations to the synthesized vectors, the machine learning classifier 410 generates coefficient weights associated with each possible attack profiled to create a classification model. A cost function is generated and minimized when the ground truth marking receives the largest output vector weight for each processed input. A subset of vectors is processed iteratively by the machine learning classifier 410 to compute the cost function, to compute the partial derivative of the cost function with respect to the model parameters, and to update the model parameters proportionally to their partial derivatives. After one or more iterations, the parameters reach optimum values that are associated with the prediction of the attack profiled associated with the new or modified measurement vectors. The machine learning classifier 410 may thereafter process the remaining vectors (e.g., those not belonging to the subset of vectors) to assess the confidence levels. Once the confidence levels exceed a predetermined threshold, the weight coefficients of the classification model are copied to the classifier 302 shown in FIG. 4.

At predetermined time intervals, the vector extractor 414 extracts data and generates measurement vectors. Like the vector extractor 402, measurement vectors are synchronized to one or more timing pulses that synchronize threat detection. If data is not sampled or detected, the vector extractor 414 process designates a vector based on no data and if measurements do not directly align with one or more timing pulses, the vector extractor 404 estimates the vector by interpolating the vector from prior and successive vectors that immediately follow and precede it.

Using the weight coefficients of the classification model parameters, the classifier 302 detect attacks when they occur, and the identifier 304 electronically identifies and electronically marks the extracted synchronized measurement vectors as anomalous or normal activities.

Figure 5:
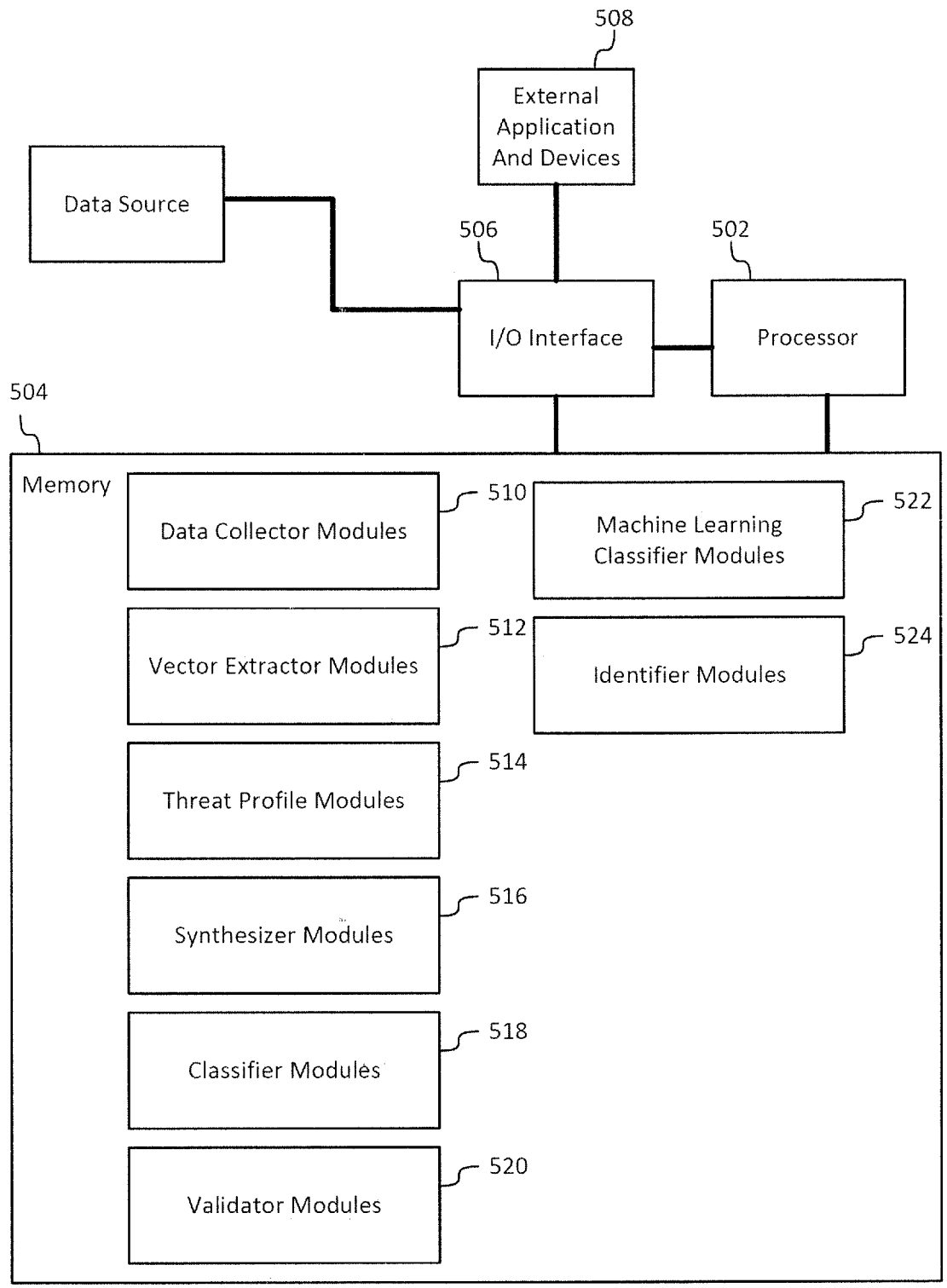
FIG. 5 is an alternate cybersecurity threat detection system.

A machine-learning model may be used to optimize the classification model parameters of FIGS. 2, 4, and 5. In an exemplary application, the input data may comprise a vector made up of $x_1, x_2, \ldots, x_n$ of real numbers. The information the vector represents is passed through a number of processing layers (at least two). In the first layer, a new vector $y_1, y_2, \ldots, y_m$ is thereafter computed as described by EQ. 1.

$$y_i = b_i + \sum_{j=1}^{n} x_j w_{i,j} \qquad \text{EQ. 1}$$

where b and w are parameters of the model. The y values, which are linearly computed from x, are then passed through a non-linear function to produce z.

$$z_i = \begin{cases} y_i & \text{if } y_i \geq 0 \\ 0 & \text{if } y_i < 0 \end{cases} \qquad \text{EQ. 2}$$

This process of computing z from x repeats for additional layers using different b and w for each layer, except that the final layer uses only a linear map function rather than the non-linear function.

FIG. 5 is a block diagram of a cyber-threat detection system operating in cyber-physical system like a vehicle. The system provides a model parameter optimizations and threat detection. The system comprises a processor 502, a non-transitory media such as a memory 504 (the contents of which are accessible by the processor 502) and an I/O interface 506. The I/O interface 506 connects devices and local and/or remote applications such as, for example, modified or additional local and/or remote data sources from external applications and devices 508. The memory 504 may store instructions which when executed by the processor 502 causes the system to render some or all of the functionality described above associated with optimizing model parameters and the detection of cyber-threats. For example, the memory 504 may store instructions which when executed by the processor 502 causes the system to render the functionality associated with detecting cyber threats through data collector modules 510, vector extractor modules 512, threat profile modules 514, synthesis modules 516, classifier modules 518, validator modules 520, machine learning classifier modules 522, and identifier modules 524. The modules are portions of programs that may be used alone or combined with other modules including those of the same program.

The processors 502 may comprise a single processor or multiple processors that may be disposed on a single chip, on multiple devices, or distributed over more than one system. The processors 502 may be hardware that executes computer executable instructions or computer code embodied in the memory 504 or in other memory to perform one or more features of the systems described herein. The processor 502 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 504 and/or storage disclosed may retain an ordered listing of executable instructions for implementing the functions described above. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. The memory 504 may comprise a single device or multiple devices that may be disposed on one or more dedicated memory devices or disposed on a processor or other similar device. When functions or steps are said to be "responsive to" or occur "in response to" a function or a process, the device functions or steps necessarily occur as a result of the function or message. It is not sufficient that a function or act merely follow or occur subsequent to another.

The memory 504 may also store a non-transitory computer code, executable by processor 502. The computer code may be written in any computer language, such as C, C++, assembly language, channel program code, and/or any combination of computer languages. The memory 504 may store information in data structures.

The functions, acts or tasks illustrated in the figures or described may be executed in response to one or more, sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination. In one embodiment, the instructions are stored on a removable media device for reading by local or remote systems. In other embodiments, the logic or instructions are stored in a remote location for transfer through a computer network or over wireless or tangible telephone or communication lines. In yet other embodiments, the logic or instructions may be stored within a given computer such as, for example, a CPU.

Cyber security systems and methods infer and monitor interactions to identify cyber threats. The systems identify malicious sensor measurements that may appear reasonable in isolation but are detectable when analyzed in contexts executed by the cyber security systems. The systems allow functionality to be added or removed into a unitary system including all of the functions shown in FIGS. 1-5 through modules. The modules may be used within power distribution systems, hydrogenation systems, heating, ventilation and air conditioning systems, industrial plants, manufacturing plants, chemical processing plants, nuclear facilities, aircrafts, ships, and vehicles. A vehicle may include without limitation, a car, bus, truck, tractor, motorcycle, bicycle, tricycle, quadricycle, or other cycle, ship, submarine, boat or other watercraft, helicopter, drone, airplane or other aircraft, train, tram or other railed vehicle, spaceplane or other spacecraft, and any other type of vehicle whether currently existing or after-arising this disclosure. In other words, it comprises a device or structure for transporting persons or things. The system is easy and quickly adapted to different vehicle systems.

Other systems, methods, features and advantages will be, or will become, apparent to one with skill in the art upon examination of the figures and detailed description. It is intended that all such additional systems, methods, features and advantages be included within this description, be within, the scope of the disclosure, and be protected by the following claims.

What is claimed is:

1. A cyber-security threat detection process, comprising;
storing a first plurality of physical data measurements from a cyber-physical system;
extracting a plurality of measurement vectors from the first plurality of physical data measurements;
synchronizing the plurality of measurement vectors to a plurality of timing pulses to render a plurality of synchronized measurement vectors;
synthesizing a plurality of simulated cyber-attacks by processing a plurality of threat profiles and the plurality of synchronized measurement vectors in response to storing the plurality of physical data measurements;
applying an alternating parametrized linear and non-linear operations in response to processing the plurality of simulated cyber-attacks to render a plurality of optimized model parameters for a classification model where the plurality of optimized model parameters use a machine learning;
modifying a plurality of model parameters of a second classification model based on the plurality of optimized model parameters; and
detecting a cyber-attack by applying the modified plurality model parameters to second physical data measurements rendered by the cyber-physical system to detect the cyber-attack;
where the plurality of threat profiles are provided by a threat profiler that render parameter files that represent various types of simulated cyber-attacks; and
where the extraction of the plurality of synchronized measurement vectors comprises rendering one or more synchronized measurement vectors that are not based on the physical data measurements.

2. The process of claim 1 where extracting the plurality of measurement vectors comprises estimating a synchronized measurement vector by processing a prior synchronized measurement vector and processing a successive synchronized measurement vector.

3. The process of claim 1 where the rendering of one or more synchronized measurement vectors are based on data.

4. The process of claim 1 where the alternating parametrized linear and non-linear operations are executed by an auto-encoder.

5. The process of claim 4 where the auto-encoder executes an auto mapping of an input layer to a smaller output layer through an encoder and performs an inverse mapping of a second smaller output layer to a second input layer.

6. The process of claim 1 where the plurality of cyber-attacks comprises a replay attack, a variable latency attack, a sensor freeze attack, an additive noise attack, and a data injection attack.

7. A cyber-security threat detection system, comprising;
a hardware processor configured to store a plurality of physical data measurements from a cyber-physical system;
the hardware processor further configured to extract a plurality of measurement vectors from the plurality of physical data measurements;
the hardware processor is further configured to synchronize the plurality of measurement vectors to a plurality of timing pulses to render a plurality of synchronized measurement vectors;
the hardware processor further configured to synthesize a plurality of simulated cyber-attacks by processing a plurality of threat profiles and the plurality of synchronized measurement vectors in response to storing the plurality of physical data measurements;
the hardware processor further configured to apply an alternating parametrized linear and non-linear operations in response to processing the plurality of simulated cyber-attacks to render a plurality of optimized model parameters for a classification model where the plurality of optimized model parameters use a machine learning;
the hardware processor is further configured to modify a plurality of model parameters of a second classification model based on the plurality of optimized model parameters; and
the hardware processor further configured to detect a cyber-attack by applying the modified plurality of model parameters to second physical data measurements rendered by the cyber-physical system to detect the cyber-attack
where the plurality of threat profiles are provided by a threat profiler that render parameter files that represent various types of simulated cyber-attacks; and
where the extraction of the plurality of synchronized measurement vectors comprises rendering one or more synchronized measurement vectors that are not based on the physical data measurements.

8. The system of claim 7 where the extraction of the plurality of measurement vectors comprises estimating a synchronized measurement vector by processing a prior synchronized measurement vector and processing a successive synchronized measurement vector.

9. The system of claim 7 where the rendering of one or more synchronized measurement vectors are not based on data.

10. The system of claim 7 where the alternating parametrized linear and non-linear operations are executed by an auto-encoder.

11. The system of claim 10 where the auto-encoder executes an auto mapping of an input layer to a smaller output layer through an encoder and performs an inverse mapping of a second smaller output layer to a second input layer.

12. The system of claim 7 where the plurality of cyber-attacks comprise a replay attack, a variable latency attack, a sensor freeze attack, an additive noise attack, and a data injection attack.

13. A non-transitory machine-readable medium encoded with machine-executable instructions, wherein execution of the machine-executable instructions is for:
storing a plurality of physical data measurements from a cyber-physical system;
extracting a plurality of measurement vectors from the plurality of physical data measurements synchronized to one or more timing pulses;
synchronizing the plurality of measurement vectors to a plurality of timing pulses to render a plurality of synchronized measurement vectors;

synthesizing a plurality of simulated cyber-attacks by processing a plurality of threat profiles and the plurality of synchronized measurement vectors in response to storing the plurality of physical data measurements;

applying an alternating parametrized linear and non-linear operations in response to processing the plurality of simulated cyber-attacks to render a plurality of optimized model parameters of a classification model where the plurality of optimized model parameters use a machine learning;

modifying a plurality of model parameters of a second classification model based on the plurality of optimized model parameters; and detecting a cyber-attack by applying the modified plurality of model parameters to second physical data measurements rendered by the cyber-physical system to detect the cyber-attack;

where the plurality of threat profiles are provided by a threat profiler that render parameter files that represent various types of simulated cyber-attacks; and where the extraction of the plurality of synchronized measurement vectors comprises rendering one or more synchronized measurement vectors that are not based on the physical data measurements.

14. The non-transitory machine-readable medium of claim 13 where the extracting of the plurality of measurement vectors comprises estimating a synchronized measurement vector by processing a prior synchronized measurement vector and processing a successive synchronized measurement vector.

15. The non-transitory machine-readable medium of claim 13 where one or more synchronized measurement vectors are based on an interpolation.

16. The non-transitory machine-readable medium of claim 13 where the alternating parametrized linear and non-linear operations are executed through an auto-encoder.

17. The non-transitory machine-readable medium of claim 16 where the auto-encoder executes an auto mapping of an input layer to a smaller output layer through an encoder and performs an inverse mapping of a second smaller output layer to a second input layer.

* * * * *